(12) United States Patent
Redburn

(10) Patent No.: US 7,437,352 B2
(45) Date of Patent: Oct. 14, 2008

(54) DATA PLOTTING EXTENSION FOR STRUCTURED QUERY LANGUAGE

(75) Inventor: Robert C. Redburn, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 10/711,559

(22) Filed: Sep. 24, 2004

(65) Prior Publication Data

US 2006/0074862 A1  Apr. 6, 2006

(51) Int. Cl.
*G06F 17/30* (2006.01)
(52) U.S. Cl. .................. 707/3; 707/4; 707/5
(58) Field of Classification Search .......... 707/3, 707/4, 10
See application file for complete search history.

(56) References Cited

U.S. PATENT DOCUMENTS

| | | | |
|---|---|---|---|
| 5,636,350 A | 6/1997 | Eick et al. | |
| 5,974,412 A | 10/1999 | Hazlehurst et al. | |
| 6,014,661 A | 1/2000 | Ahlberg et al. | |
| 6,067,542 A | 5/2000 | Carino, Jr. | |
| 6,208,985 B1 * | 3/2001 | Krehel | 707/3 |
| 6,320,586 B1 * | 11/2001 | Plattner et al. | 715/700 |
| 6,460,031 B1 * | 10/2002 | Wilson et al. | 707/3 |
| 6,507,840 B1 | 1/2003 | Ioannidis et al. | |
| 6,578,028 B2 | 6/2003 | Egilsson et al. | |
| 6,993,533 B1 * | 1/2006 | Barnes | 707/102 |
| 2003/0084043 A1 | 5/2003 | Acharya et al. | |
| 2003/0130967 A1 | 7/2003 | Mannila et al. | |
| 2003/0149689 A1 | 8/2003 | Chow et al. | |
| 2006/0059205 A1 * | 3/2006 | Shah et al. | 707/200 |

OTHER PUBLICATIONS

Cruz F. Cruz User-Defined Visual Query Languages, 1994, pp. 224-231.*
Hebert et al. Oracle Spatial, User's Guide and Reference, Release 8.1.6, pp. 1-20.*
Nayyar, Kara. Q-SQL: support for graph generation, India Annual Conference,2004, Proceedings of the IEEE Indicon, pp. 521-524, Dec. 20-22,2004.*
Nayyar et al. Graph Definition Language for G-SQL, INDICON, 2005, Annual IEEE, pp. 171-175, Dec. 11-13, 2005.*
Title: User-Defined Visual Query Languages (pp. 224-231) Author: Isabel F. Cruz Author Affiliation: Dept. of Electr. Eng. and Computer Science, Tufts University, Medord, MA, USA Publication Date: 1994—Country of Publication: USA Published In: Conference Title: Proceedings of 1994 IEEE Symposium On Visual Languages -St. Louis, MO. USA.

* cited by examiner

*Primary Examiner*—Cam Y Truong
*Assistant Examiner*—Baoquoc N To
(74) *Attorney, Agent, or Firm*—Joseph Petrokaitis

(57) ABSTRACT

Information is typically obtained from a relational database using a query in structured query language (SQL). An extension to the SQL standard is described which permits plotting the results of a query. SQL keywords are provided for specifying a format for graphing selected data, and syntax for recognizing those keywords, thereby causing the data to be presented as a graph according to the specified format. This extension of SQL maintains the syntax and style of conventional SQL queries. This permits automated systems, such as database driven websites, to issue extended SQL queries directly to a relational database and have the results returned as formatted graphical content.

8 Claims, 10 Drawing Sheets

```
select distinct partnumber, count(*) as total
from ayleweb.plyopers
group by partnumber
```

FIG. 2A
*PRIOR ART*

| PARTNUMBER | TOTAL |
|---|---|
| 66P3399 | 64 |
| 66P7319 | 59 |
| 73P5362 | 30 |
| 76P5427 | 34 |

21 — PARTNUMBER
22 — TOTAL

FIG. 2B
*PRIOR ART*

```
select xvar, yvar from schema.table
  ⌣31        ⌣32  ⌣33
plot as <charttype> var <column> on xaxis as '<label>',
  ⌣33         ⌣34           ⌣35  ⌣34             ⌣36
        {<column> on yaxis as '<label>',....}
         ⌣38                   ⌣36
{title1 = '<titletext>'}{title2 = '<titletext>'}
 ⌣37       ⌣41            ⌣39      ⌣41
{footnote1 = '<footertext>'}{footnote2 = '<footertext>'}
 ⌣42         ⌣40             ⌣43        ⌣40
{file = '<filename>'}{imagetype = '<imagetype>'}
 ⌣44     ⌣45          ⌣46          ⌣45
{xsize = <size>}{ysize = <size>}
 ⌣47
{legend [none|right|left|bottom]}
```

FIG. 3

```
     ⎧select distinct partnumber, count(*) as total
  51 ⎨from ayleweb.plyopers
     ⎩group by partnumber
     ⎧plot as vbar var partnumber on xaxis as 'partnumber',
     ⎪total on ylaxis as 'total'
  52 ⎨title1 = 'total plyopers by partnumber'
     ⎩footnote1 = 'robert redburn'
```

```
61—select distinct (chip/100) as chipx,
       chip-((chip/100)*100) as chipy, (chip/100 as chipx2,
       30-(chip/100*2 as chipy2
   from ayleweb.aprcsegmentdata
   where wafer = 'HJDGP0G'
62—plot as scatter var chipx on xaxis as 'chip x',
   chipy on ylaxis as 'chip y',
   chipx2 on y2axis as 'y2chip'
   title1 = 'random chip coordinates'
   title2 = 'second title'
   footnote1 = 'robert redburn'
   xsize = 600 ysize = 450
```

DATA PLOTTING EXTENSION FOR STRUCTURED QUERY LANGUAGE

BACKGROUND OF INVENTION

This invention relates to queries directed to relational databases using Structured Query Language (SQL), and more particularly to obtaining graphical representations (data plots) of the data retrieved in accordance with those queries.

Structured Query Language (SQL) is an industry standard for writing queries to retrieve data from relational databases. In a typical database system (often called a relational database management system or RDBMS), shown schematically in FIG. 1, database 1 is controlled by database software on a server device 2. A user enters a query, written in SQL, on an input device 3 connected to a client device 4; the transmitted query 5 causes a dataset 6 to be returned from the database. In general, execution of an SQL query by a database system returns a text based dataset. A typical query is shown in FIG. 2A, requesting a count of selected distinct part numbers. As shown in FIG. 2B, the result of the query is a list 21 of part numbers and the corresponding counts 22, presented in two columns as text data (usually in a standard ASCII format). Usually the user wishes to process the data further, for example by making input to a calculation or presenting the data in the form of a graph.

If a graphical presentation of the text data is desired, the user must then manipulate the text data and use plotting software or plot the data manually. In either case, the user must perform a number of additional steps to obtain the data as a graph instead of text; furthermore, these steps are not part of the query process. At present there is no interface defined in the SQL standard which allows a user to specify that the query results should be plotted in a graph instead of being returned as raw text data. In particular, there are no existing keywords or user-selectable response formatting syntax which would permit graphical display of the returned query results.

Several systems and techniques have been proposed for generating database queries so that the queries may be viewed in graphical form. For example, "User-Defined Visual Query Language" (Cruz, Proc. IEEE Symposium on Visual Languages, St. Louis, October 1994, p. 224) describes an object-oriented database query language in which objects are given graphical definitions, so that the structure of the query may be viewed as a picture on a screen, and a user can extract information about the data in a visual fashion. Accordingly, the query is presented in a visualized form. U.S. Pat. No. 6,578,028 (Egilsson et al.) describes a graphical SQL query generator by which a standard SQL query may be constructed using a graphical user interface (GUI). Several statistical methods are described for calculating dependency matrices among the data in the database; the dependency matrices are associated with a relation definition. A GUI may be used with the matrices to construct an SQL query.

In addition, systems have been developed wherein types and characteristics of data returned from a database are presented graphically. U.S. Pat. No. 6,014,661 (Ahlberg et al.) describes an automated method for analyzing data fields in a database, in which data is downloaded from a database and relationships within the data set are displayed graphically; a GUI is used for interactive exploration of the database. Although this system facilitates analysis of and browsing in the database, the returned result of a query is still formatted only as text data. U.S. Pat. No. 5,636,350 (Eick et al.) describes a system in which characteristics of a result of a query are displayed graphically, and symbols are displayed whose appearance varies according to the number of items of data satisfying the query (number of hits).

None of the above-noted references discusses a method for plotting the actual data returned by a database query (as opposed to characteristics of the data). Furthermore, these systems do not include a way to specify graph plotting as part of the SQL query. There remains a need for a method which allows a user to query a database and graphically view the results without any intermediate steps.

SUMMARY OF INVENTION

The present invention addresses the above-described need by providing an extension to the SQL standard for plotting the results of a query. In particular, the invention provides keywords for specifying a format for graphing selected data, and syntax for recognizing those keywords, thereby causing the data to be presented as a graph according to the specified format. This extension of SQL maintains the syntax and style of conventional SQL queries. This permits automated systems, such as database driven websites, to issue extended SQL queries directly to a relational database and have the results returned as formatted graphical content.

In accordance with a first aspect of the invention, a method is provided for obtaining information from a relational database. This method includes formulating a query to retrieve data from the database; a first portion of the query specifies the data to be retrieved, and a second portion of the query specifies a format for graphing the data. The query is then transmitted to the database, and the data is returned from the database in accordance with the query. The data is then presented in accordance with the specified format. The first portion of the query and the second portion of the query are preferably formulated in SQL. The data may be returned as a binary image, or alternatively as an image representation of the data in ASCII format. As part of the step of returning the data, the query is preferably interpreted in accordance with SQL having keywords and syntax for specifying the format (that is, instructions for presenting the data as a graph). The graphical image may be for example a line graph, a horizontal bar chart, a vertical bar chart, a pie chart, a scatter plot, a contour plot, or a wafer map, in accordance with a keyword in the second portion of the query.

Furthermore, the process of returning the data may include interpreting the first portion of the query to cause the data to be retrieved from the database; creating a dataset for the data; incorporating the data into the dataset; and constructing a graphical image using the data, in accordance with the specified format. The step of interpreting may further include parsing the query so that the first portion of the query and the second portion of the query are interpreted separately.

In accordance with another aspect of the invention, a method is provided for querying a database which includes the steps of specifying the data to be returned from the database in a first portion of a query, and specifying a format for graphing the data in a second portion of the query. The data are thus returned as a graphical image in accordance with the specified format. The first portion and second portion of the query are both preferably in a structured query language (SQL) which includes keywords and syntax for specifying the format. The graphical image may be either a binary image, or a representation of the data in ASCII format; the graphical image may be a line graph, a horizontal bar chart, a vertical bar chart, a pie chart, a scatter plot, a contour plot, or a wafer map, in accordance with a keyword in the second portion of the query.

In accordance with an additional aspect of the invention, a system is provided for retrieving and presenting data from a database. This system includes the database; an input device for entering a database query; a device for interpreting the query which is effective to format the data for presentation in graphical form; and an output device for presenting the data as a graphical image. The query preferably is formulated in a structured query language (SQL), and includes a first portion specifying the data to be retrieved and a second portion specifying the graphical form.

In this system, the device for interpreting the query preferably has an interpreter for interpreting both the first portion and the second portion of the query. Alternatively, the device for interpreting the query may have a first interpreter for interpreting the first portion of the query and a second interpreter for interpreting the second portion of the query. In the latter case the first interpreter is effective to cause return of the data from the database in accordance with the first portion of the query, while the second interpreter is effective to parse the query into the first portion and the second portion; create a dataset for the data; incorporate the data into the dataset; and construct the graphical image using the data, in accordance with the second portion of the query.

According to a further aspect of the invention, a computer-readable storage medium is provided which has stored therein instructions for performing a method for obtaining information from a relational database, as described above. This method includes querying a database to retrieve data therefrom; transmitting the query to the database; causing the data to be returned from the database in accordance with the query; and presenting the data in accordance with a specified format.

According to another aspect of the invention, a computer program product is provided for performing a method as described above.

According to a further aspect of the invention, an improvement of a computer program product for interpreting a structured query language is provided. This improvement includes first computer program code for recognizing keywords for specifying a format for graphing data returned from a database, and second computer program code for causing the data to be presented as a graph according to the specified format. The first computer program code may include code for recognizing a delimiter keyword which separates SQL statements in a first portion of the query specifying the data from SQL statements in a second portion of the query specifying the format.

BRIEF DESCRIPTION OF DRAWINGS

FIG. 2A shows a typical SQL query.

FIG. 2B shows the format of the result of the query of FIG. 2A.

FIG. 3 shows the syntax used to generate a plot of data from an SQL query, in accordance with the present invention.

DETAILED DESCRIPTION

SQL Extension: Keywords and Syntax

Figure 1:
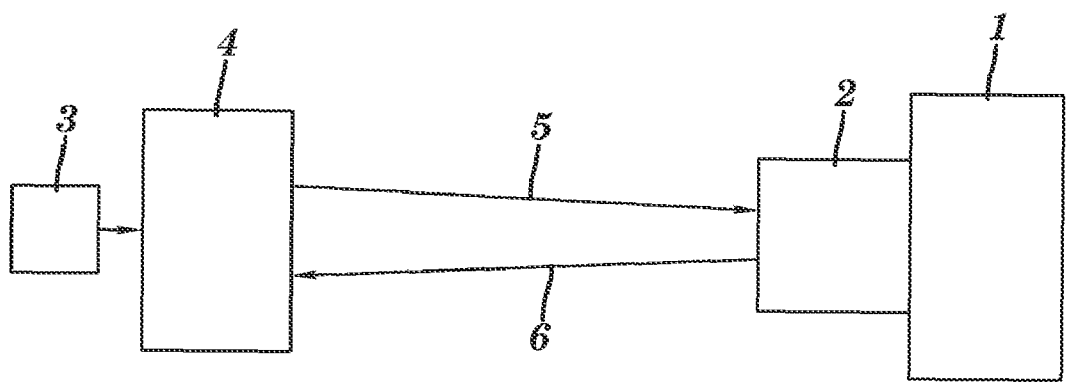
FIG. 1 schematically illustrates a typical database system in which an SQL query is made and data is returned from a database.

In a preferred embodiment, the SQL standard is extended by adding the keywords listed below in Table 1.

TABLE 1

| Keywords for SQL Data Plotting Extension | | | |
| --- | --- | --- | --- |
| PLOT | VAR | ON | |
| XAXIS | Y1AXIS | Y2AXIS | ZAXIS |
| TITLE1 | TITLE2 | LEGEND | |
| FOOTNOTE1 | FOOTNOTE2 | | |
| LINE | HBAR | VBAR | |
| PIE | SCATTER | CONTOUR | WMAP |
| FILE | IMAGETYPE | | |
| XSIZE | YSIZE | | |

The syntax used to generate a plot from a basic SQL query is illustrated in FIG. 3 and described in more detail below. In FIG. 3, bracketed statements are optional. The PLOT statement 31 is used to specify that the data from the query is to be plotted. (It will be appreciated that standard SQL "helper" words, e.g. BY, AS, THE, are used freely.) The data is obtained by constructing a query generally including SELECT and FROM, as is known in the art. The variables to be plotted, specified using the VAR keyword 32, may be any of the columns of data in the dataset (that is, any selected column 33 in the text format of the dataset, indicated by <column> in FIG. 3). The axes 34 to be used in the plot (XAXIS, Y1AXIS, Y2AXIS or ZAXIS) are specified using the ON keyword 35. Each of the axes may be given a label 36, illustrated in FIG. 3 as <label>. The plot may also be given titles and footnotes using the keywords TITLE1, TITLE2, FOOTNOTE1, FOOTNOTE2 37-40; the text of the titles 41 and footnotes 42 are illustrated in FIG. 3 as <titletext> and <footertext> respectively. If it is desired to save the plot as a file with a selected image type, a file name <filename> is assigned using the FILE keyword 43. An image type <imagetype> is assigned using the IMAGETYPE keyword 44; otherwise the default image type is used. The size of the displayed plot in the x and y directions may be specified using the keywords XSIZE 45 and YSIZE 46, respectively. In addition, the location of a legend indicating the plotted variables may be specified using the optional LEGEND keyword 47.

It will be appreciated that different names could be chosen for the keywords enabling the functions described herein.

A number of different types of plots may be drawn from the same data; that is, <charttype> in FIG. 3 may be replaced by any of these keywords: LINE, HBAR, VBAR, PIE, SCATTER, CONTOUR, and WMAP. The various types of plots are therefore as shown in Table 2.

TABLE 2

Types of Plots for SQL Data Plotting Extension

| | |
|---|---|
| LINE | Line graph |
| HBAR | Horizontal bar graph |
| VBAR | Vertical bar graph |
| PIE | Pie chart |
| SCATTER | Scatter plot |
| CONTOUR | Contour plot |
| WMAP | Wafer map |

It will be appreciated that still other types of charts may be defined and plotted, in addition to those discussed herein.

Figures 4A, 4B:
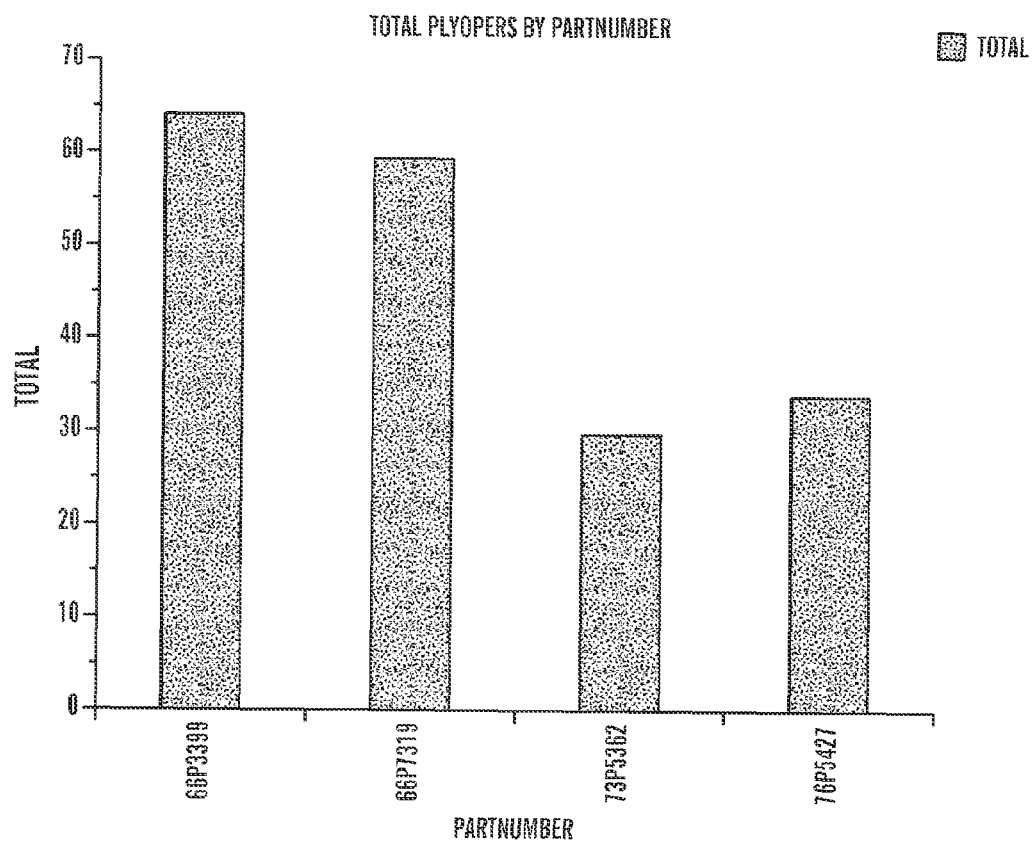
FIG. 4A shows the SQL query of FIG. 2A, modified in accordance with the invention to generate a graph of the data returned from the database.
FIG. 4B shows the plot generated from the query of FIG. 4A.

An example of an application of this syntax is shown in FIGS. 4A and 4B. The first three lines 51 of this query are identical to the query shown in FIG. 2B. The last four lines 52 of the query begin with PLOT AS VBAR, meaning that the returned data is to be plotted as a vertical bar graph. The keyword VAR introduces the variables to be plotted; the part-number 21 on the x-axis, and the total 22 on the y-axis (compare FIG. 2B). The labels for these axes (each following AS) are specified as PARTNUMBER and TOTAL respectively. The title of the graph is specified using the TITLE1 keyword, and a footnote is specified using the FOOTNOTE1 keyword. The LEGEND keyword is not used in the query, so a legend is placed in a default location to the right of the graph.

It should be noted that the query of FIG. 4A returns pixel data in a binary image format as shown in FIG. 4B. The data is thus presented graphically as a direct result of the query, without intermediate steps (such as invoking another programming application to manipulate the raw returned data). A comparison of FIG. 4B with FIG. 2B shows that the graph of FIG. 4B presents the same data as the raw data of FIG. 2B.

Figure 4C:
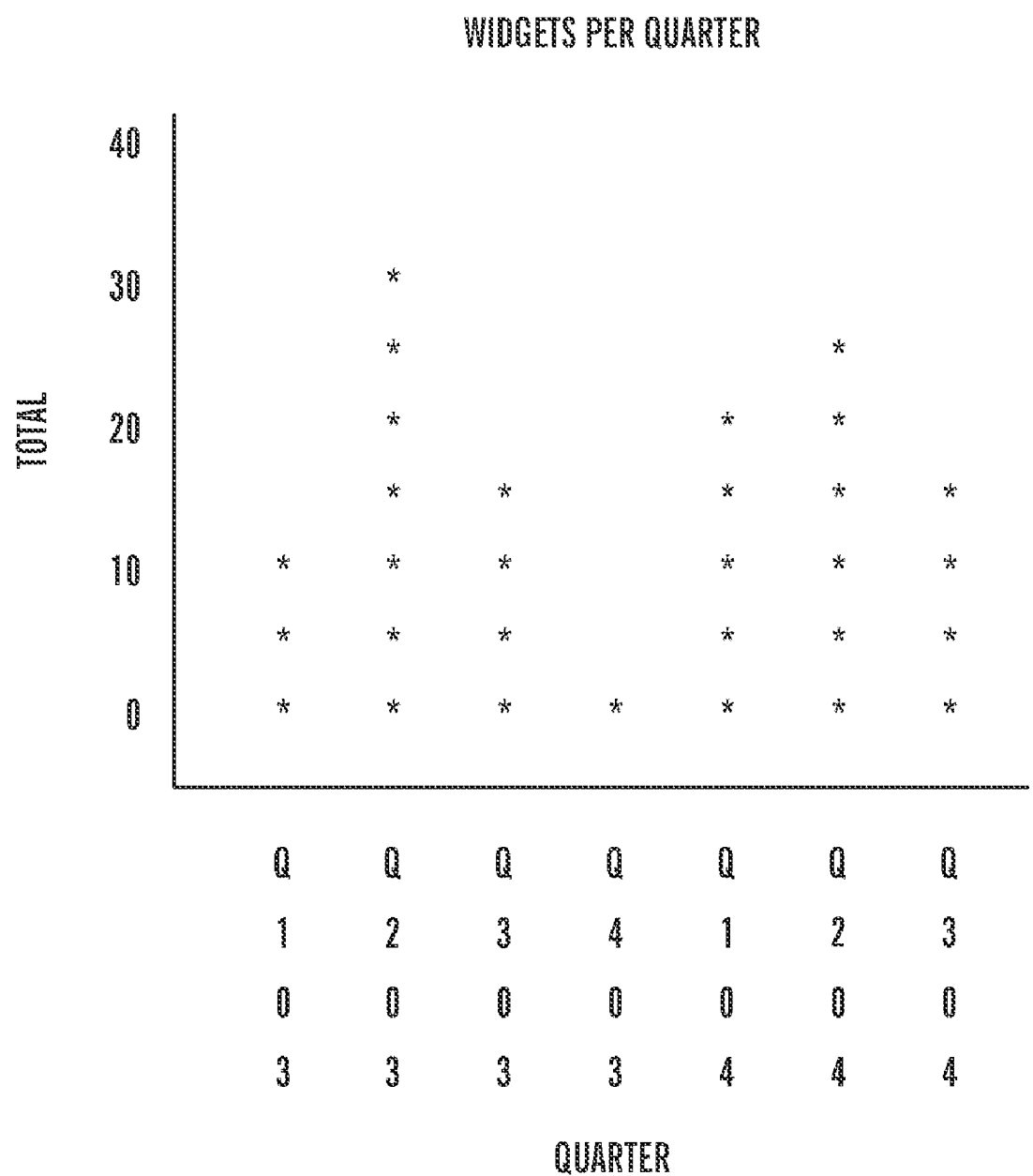
FIG. 4C shows an example of a plot in ASCII format.

Alternatively, the query may simply return a representation of the data in ASCII format. An example of a plot in ASCII format is shown in FIG. 4C.

Figures 5A, 5B:
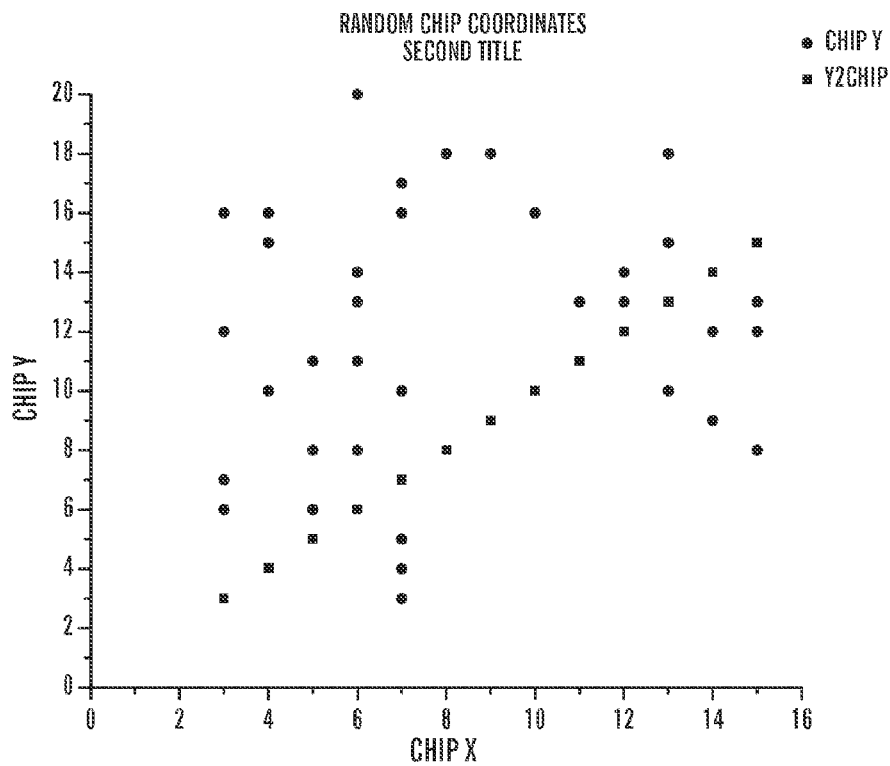
FIG. 5A shows another example of an SQL query according to the present invention.
FIG. 5B shows the plot generated from the query of FIG. 5A.

Another example of the syntax of the SQL extension of the invention is shown in FIGS. 5A and 5B. This example shows distinct sets of data presented on the same graph. The SELECT statement 61 specifies that columns of data labeled chipx, chipy, chipx2 and chipy2 are to be returned from the database. The PLOT statement 62 specifies that a scatter plot is to be produced with the variable chipx plotted in the x-direction, and two variables chipy and chipx2 plotted in the y-direction. The variables chipx, chipy and chipx2 are given the labels "chip x", "chip y" and "y2 chip". (Note that in this example not all of the returned data is included in the plot.) According to this syntax, in the PLOT statement VAR is followed by the variable name, ON by the axis on which that variable is to be plotted, and AS by the label given that variable on the graph. The x-axis, left-hand y-axis, and right-hand y-axis of the graph are given the labels for the XAXIS, Y1AXIS and Y2AXIS variables respectively. Although each variable name (e.g. chipx2) must match a column of data in the dataset, this group of data may be plotted with a different label (in this case, "y2chip").

Implementation of Extended SQL

Figure 6:
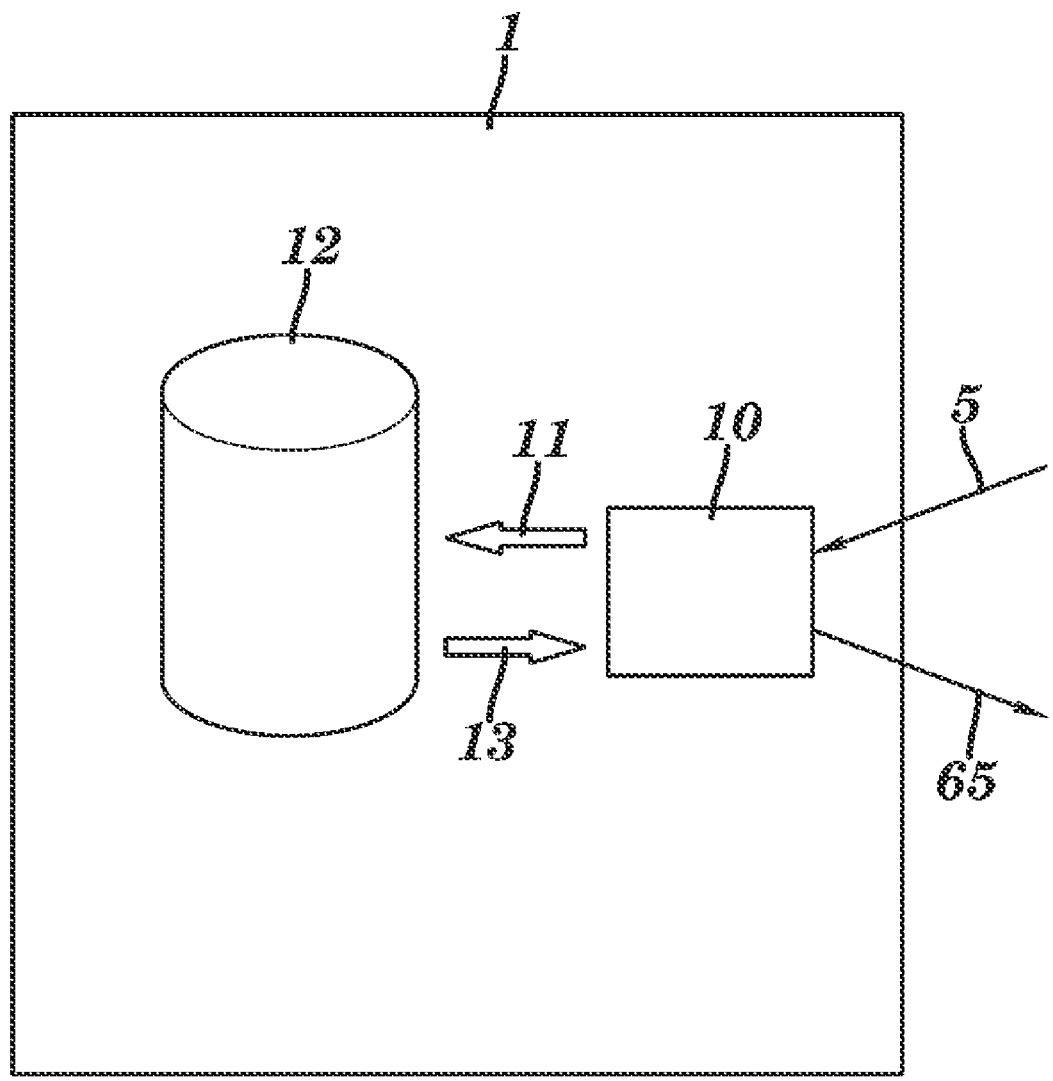
FIG. 6 schematically illustrates a relational database including an SQL interpreter which receives SQL queries.

A database 1 implementing the present invention is shown schematically in FIG. 6. Database 1 is controlled by a database management system and includes a data storage medium 12 and an SQL interpreter 10. An incoming query 5, written in SQL, causes the SQL interpreter to send an internal request 11 for return of data 13. (This internal request is in general not made in SQL, but is a set of machine-readable instructions.) In a preferred embodiment of the invention, the SQL interpreter 10 is capable of interpreting the extended SQL queries described above, so that the output 65 from the database 1 is a binary image which can be presented as a graph. A system including a database with such an interpreter is shown schematically in FIG. 7A. The query generator 71 (e.g. a user making input to a client system) transmits query 5 in the extended SQL; the output 65 is a binary image which may be in any of a variety of formats, but is generally binary pixel data in a standard image format such as jpeg, .gif, .png or the like. The output 65 may thus be viewed as a graphical image 72 on any of a number of media, including a display screen, a web page, a desktop application, etc.; alternatively, the image may be stored as a file on a data storage medium.

Figure 7A:
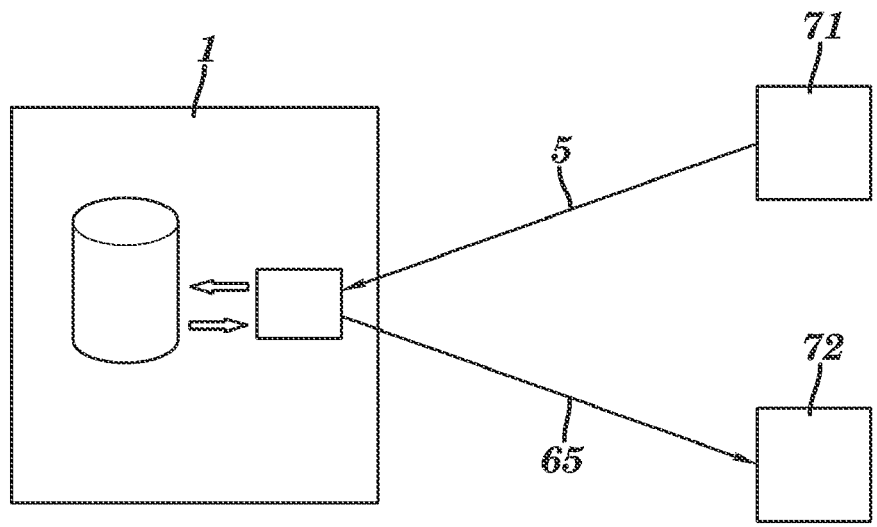
FIG. 7A illustrates an embodiment of the invention in which the SQL interpreter receives SQL queries formulated using the syntax of the SQL extension according to the present invention.
Figure 7B:
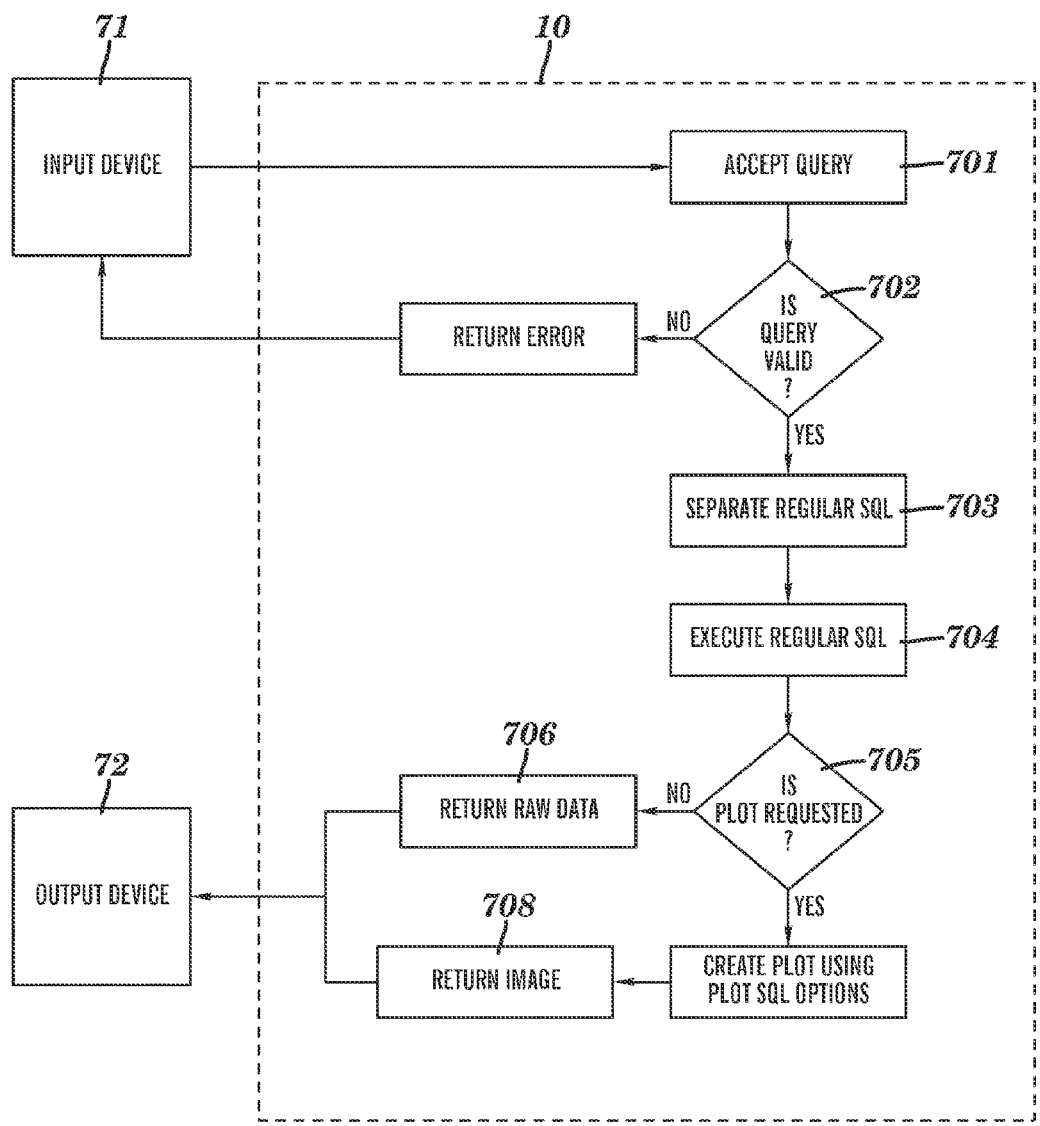
FIG. 7B is a flowchart showing steps carried out by the SQL interpreter of FIG. 7A.

FIG. 7B is a flowchart showing the sequence of steps executed by the interpreter 10 in this embodiment. The interpreter accepts a query transmitted from the input device 71 (step 701). In step 702, the interpreter determines whether the query is valid (that is, whether all of the keywords are recognized and the statements have proper syntax). An error message is returned if the query is invalid. A valid query is separated into a first portion in "regular" or standard SQL and a second portion in extended SQL (step 703). The keyword PLOT may be used as a convenient delimiter between the first and second portions of the query. The portion of the query in standard SQL is executed (step 704), resulting in data being returned from the database. If a plot of the data is requested as part of the query (step 705), the interpreter proceeds to create the plot; otherwise the raw data is returned to the output device 72 (step 706). In step 707, the plot is created based on the arguments to the PLOT statement. The interpreter searches the PLOT statement for the plot specifications, and prepares those specifications as inputs to a charting routine. (The charting routine may be integrated with the interpreter, but is typically a separate third-party program.) The charting routine draws the plot in the specified format and inserts the data. The completed plot (a binary image as described above) is then transmitted to the output device 72 (step 708).

Figure 8A:
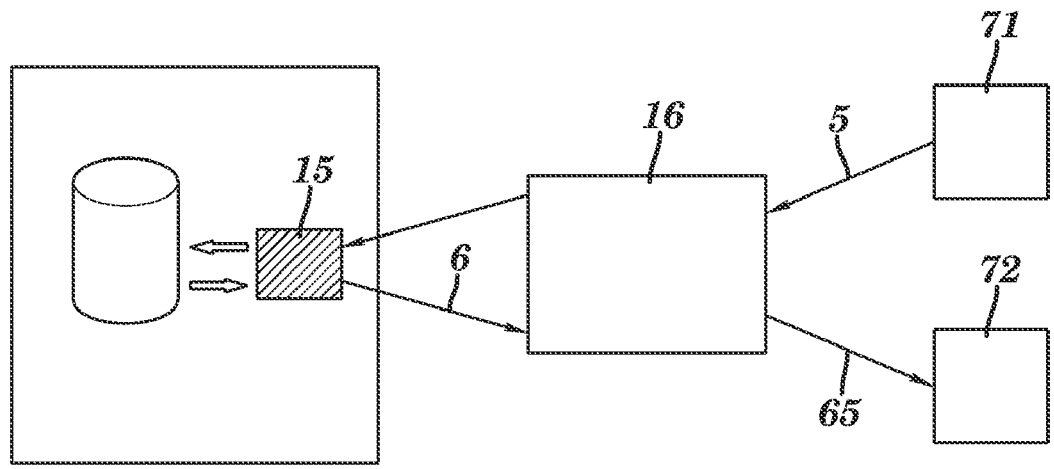
FIG. 8A illustrates another embodiment of the invention in which a standard SQL interpreter communicates with an additional SQL interpreter capable of receiving SQL queries formulated using the syntax of the SQL extension according to the present invention.

If the interpreter resident in the database is not capable of recognizing the SQL extensions of the present invention, the invention may be implemented using the system shown schematically in FIG. 8A. In this embodiment of the invention, the database interpreter 15 only recognizes the conventional SQL; an additional interpreter 16 is used to parse the query 5 into recognizable and non-recognizable tokens, with the PLOT keyword serving as a delimiter. Interpreter 16 is itself a program, written in a general-purpose programming language such as PHP, Java or the like, and may advantageously include conventional charting software. The standard portion of the SQL query is passed on to the database 1. The interpreter 16 creates a dataset containing only those data that will be plotted, in accordance with the PLOT statement. When data 6 returns from the database (raw data in ASCII format), that data is incorporated into the dataset and passed to the charting software, which then constructs a graphical image using the dataset as specified in the query. The output 65 of interpreter 16 is then a graphical image as specified in the PLOT statement in the query. Interpreter 16 may be a stand-alone program as shown in FIG. 8A, or may be integrated into the RDBMS.

Figure 8B:
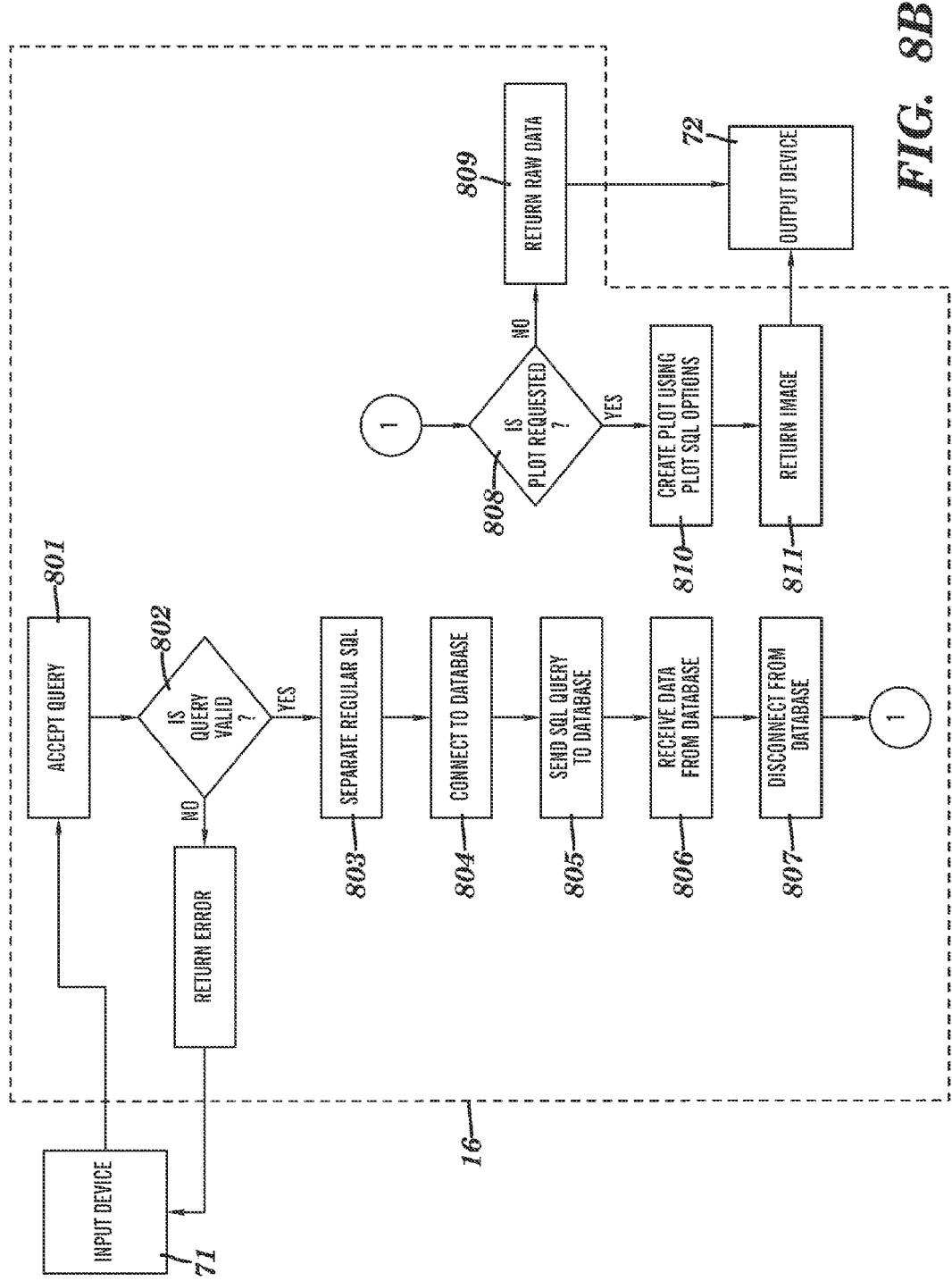
FIG. 8B is a flowchart showing steps carried out by the additional SQL interpreter of FIG. 8A.

FIG. 8B is a flowchart showing the sequence of steps executed by the interpreter 16 in this embodiment. In this example, the interpreter 16 is assumed to be separate from the database. The interpreter accepts a query, determines whether it is valid, and separates the query into a portion in "regular" SQL and a portion in extended SQL, as in the previous embodiment (steps 801-803). The interpreter then establishes a connection to the database (step 804), and sends the first portion of the query to the database as a standard SQL query (step 805). In response to this query, the interpreter receives raw data from the database (step 806); the interpreter then disconnects from the database (step 807). If a plot is not requested as part of the original query (step 808), the raw data is returned to the output device 72 (step 809). If a plot is requested, the interpreter proceeds to create the plot in accordance with the PLOT statement in the query (step 810). The interpreter 16 may include a charting routine, or alternatively may send the plot specifications to a separate charting routine. The completed plot is then returned to the output device 72 as a binary image (step 811).

It should be noted that from the viewpoint of the user, the systems shown in FIG. 7A and FIG. 8A are equivalent. In both cases, the user need specify the graphical format for viewing the data only once, as an integral part of the query.

The above-described extension to SQL has been implemented on a system having an IBM DB2 database. Specifically, the features of the SQL extension were coded in PHP as a wrapper around the database. This implementation was made as shown in FIGS. 8A and 8B. However, as discussed above, it is preferable for the database to support the SQL extension directly, as an addition to the existing SQL executor.

A distinction should be drawn between retrieving a plot from a database and plotting data retrieved in response to a query. In the foregoing descriptions, an image representation of raw ASCII data is returned as a result of a query having a PLOT statement. The database may also be configured to include binary long objects (BLOB objects). As is understood by those skilled in the art, a BLOB is a database table column type, used to store binary data in a database. Such binary data may be retrieved directly from the database using standard SQL. Since a BLOB is capable of storing any binary content, it is possible for a BLOB to contain a binary image such as a plot. However, receiving BLOB data using a standard SQL query is different from making a query in the extended SQL of the invention, wherein a PLOT statement specifies how the data is to be presented as a binary image. In the latter case, the data selected in the first part of the query (i.e. with the SELECT statement) is not returned to the user directly. Instead, the interpreter creates a new representation of the original data according to the options specified by the user in the PLOT statement. In contrast, a query in standard SQL involving BLOB data results in the database returning the original data requested in the SELECT statement, without any additional interpretation. Furthermore, binary image data (BLOB objects) in general cannot be plotted, and thus would not be recognized by an SQL query made according to the present invention.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A method for obtaining information from a relational database, comprising the steps of:

formulating a text query to retrieve data from the relational database,
where a first portion of the text query specifies the data to be retrieved and a second portion of the text query specifies a format for graphing the data;

transmitting the text query to the relational database, wherein the first portion of the text query and the second portion of the text query are formulated in a structured query language (SQL);

executing the text query;

returning data from the relational database in accordance with the text query;

interpreting the text query in accordance with the structured query language (SQL) having keywords and syntax for specifying said format, wherein said keywords are for a SQL data plotting extension and wherein said syntax recognizes said keywords for graphing the data; and presenting the data in accordance with said format, wherein the graphical image is one of a line graph, a horizontal bar chart, a vertical bar chart, a pie chart, a scatter plot, a contour plot, and a wafer map, in accordance with a keyword in the second portion of the text query.

2. A method according to claim 1, wherein the data is returned as a binary image and presented as a graph.

3. A method according to claim 1, wherein an image representation of data in ASCII format is returned from the relational database and presented as a graph.

4. A method according to claim 1, wherein said returning step further comprises:

interpreting the first portion of the text query to cause the data to be retrieved;

creating a dataset for the data;

incorporating the data into the dataset; and constructing a graphical image using the data, in accordance with said format.

5. A method according to claim 4, wherein said interpreting step further comprises parsing the text query so that the first portion of the text query and the second portion of the text query are interpreted separately.

6. A method for querying a relational database, comprising the steps of:

specifying the data to be returned from the relational database in a first portion of a text query;

specifying a format for graphing the data in a second portion of the text query; and executing the text query, thereby returning the data as a graphical image in accordance with said format;

wherein the first portion of the text query and the second portion of the text query arc in a structured query language (SQL), wherein the SQL includes keywords and syntax for specifying said format, wherein said keywords are for a SQL data plotting extension and wherein said syntax recognizes said keywords for graphing the data and wherein the graphical image is one of a line graph, a horizontal bar chart, a vertical bar chart, a pie chart, a scatter plot, a contour plot, and a wafer map, in accordance with a keyword in the second portion of the text query.

7. A method according to claim 6, wherein the graphical image is a binary image.

8. A method according to claim 6, wherein the graphical image is a representation of the data in ASCII format.

* * * * *